UNITED STATES PATENT OFFICE.

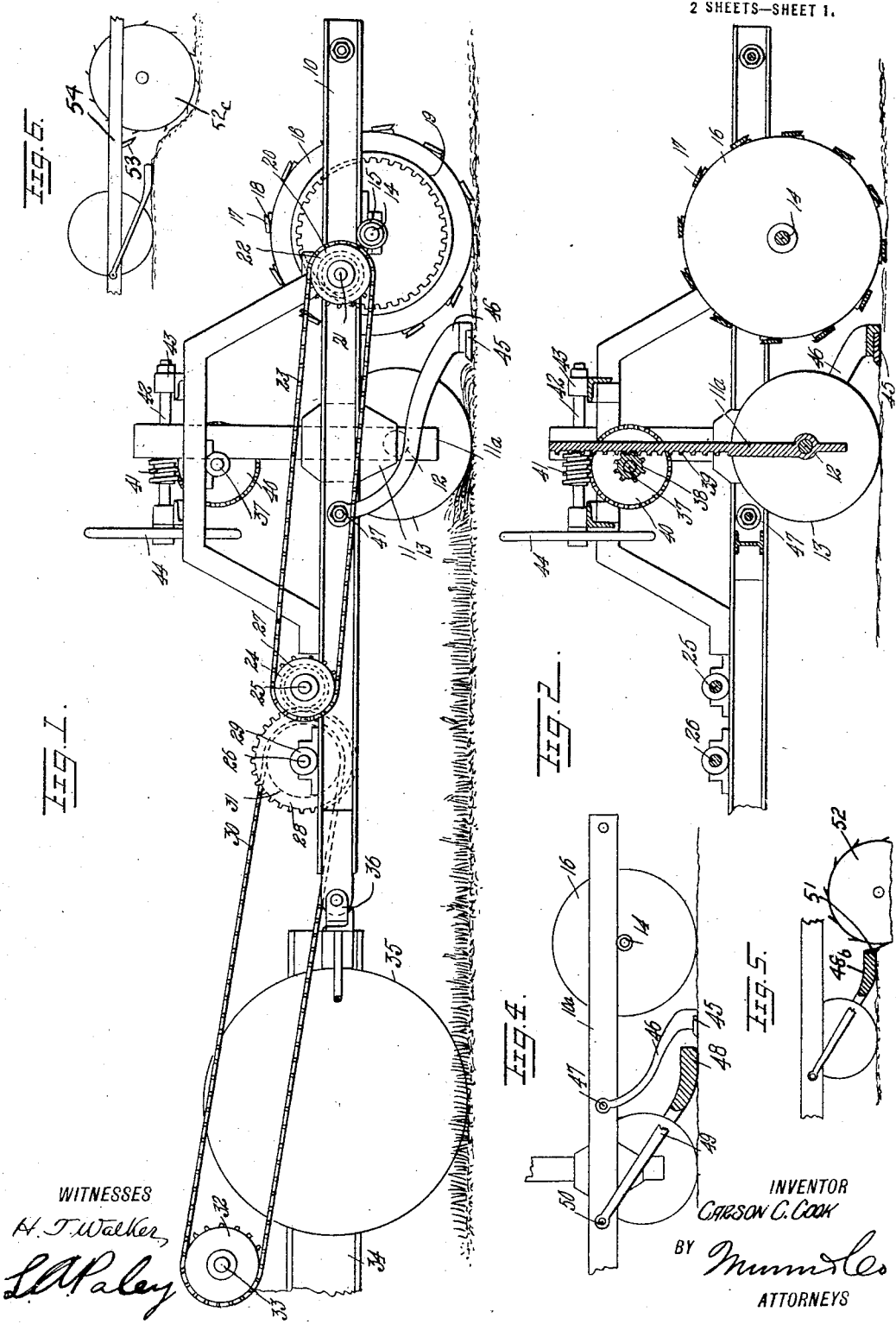

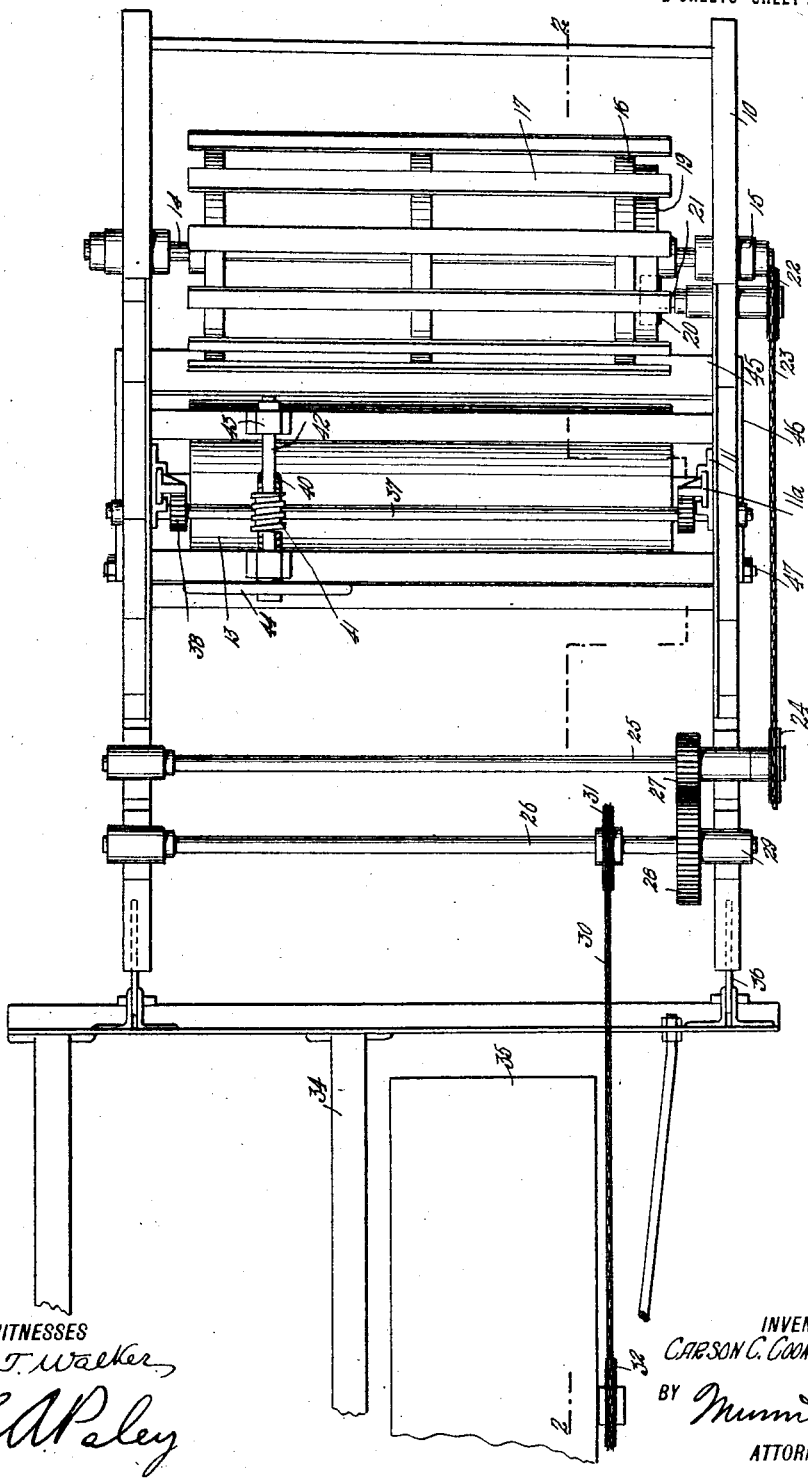

CARSON CAUGHEY COOK, OF STOCKTON, CALIFORNIA.

SOIL-TILLING MACHINE.

1,409,832.   Specification of Letters Patent.   Patented Mar. 14, 1922.

Application filed September 11, 1920. Serial No. 409,518.

*To all whom it may concern:*

Be it known that I, CARSON C. COOK, a citizen of Canada, and a resident of Stockton, county of San Joaquin, and State of California, have invented a new and Improved Soil-Tilling Machine, of which the following is a full, clear, and exact description.

This invention relates to a machine for tilling the soil, and has reference more particularly to a rotating tiller having knives on its periphery which till the soil as said tiller is rotated.

This invention further relates to improvements in the machine illustrated and described in my co-pending application filed May 15th 1920, Serial No. 381716.

An object of this invention is to provide apparatus for tilling the soil in which the weeds, corn stalks, and other vegetation is first rolled flat and then cut into fine particles by the tiller which also tills the soil.

Reference is to be had to the accompanying drawing forming a part of this specification, in which it is understood that the drawing illustrates only one form of the invention with a certain modification, and in which—

Figure 1 is a side view of my machine.

Figure 2 is a sectional view through the machine being taken on the line 2—2 of Figure 3.

Figure 3 is a top view of the machine.

Figure 4 is a diagrammatic side view of a modified form of my machine.

Figure 5 is a diagrammatic side elevation of a second modified form of my machine.

Figure 6 is a diagrammatic side elevation of a third modified form of my machine.

Referring to the accompanying drawing by numerals, 10 indicates the frame work of the machine which may have any suitable construction, said frame work being provided with brackets 11 in which is slidably supported a vertical rack bar $11_a$, said rack bar serving to rotatably support an axle 12. A heavy roller 13 is mounted on this axle, said roller serving to support the machine as same is transported from place to place, and when the machine is in operation tilling the soil. The axle 12 is preferably mounted substantially midway between the ends of the machine, and to the rear of the machine is mounted a second axle 14 rotatably supported in brackets 15, said brackets being secured to the frame work 10. A plurality of discs 16, preferably three in number, is secured to the axle 14, and a plurality of parallel knives 17 having sharp edges 18, is secured to the periphery of said discs 16.

The tiller consisting of the discs 16 and knives 17 is provided on one end with an internal gear 19 meshing with a pinion 20, said pinion being secured to a shaft 21 mounted transversely of the frame work 10. The shaft 21 may be rotated continuously by any suitable mechanism such as a sprocket wheel 22 secured to said shaft, said sprocket wheel being rotatably connected by a chain 23 to a second sprocket wheel 24 secured to a shaft 25, said shaft being rotatably supported in brackets on the frame work 10. The shaft 25 is driven from a shaft 26, the shafts 25 and 26 being rotatably connected by a pinion 27 on the shaft 25 meshing with a gear 28 on the shaft 26. The shaft 26 is rotatably supported in brackets 29 secured to the frame work 10, and said shaft 26 is driven by a chain 30 connecting a sprocket wheel 31 on the shaft 26 to a sprocket wheel 32 secured to a shaft 33, said shaft 33 being rotatably mounted on a tractor frame work 34. The shaft 33 is driven from any suitable power means not shown on said tractor. The tractor frame work 34 is mounted on wheels 35 which may be caterpillar if so desired, and said frame work 34 is pivotally connected by couplings 36 to the forward end of the frame work 10. The couplings 36 are adapted to permit slight, vertical, relative movement of the frame works 10 and 34, but is adapted to prevent said frame works from moving sideways and becoming out of line.

A shaft 37 is rotatably mounted transversely of the frame work 10, said shaft carrying a pinion 38 which meshes with teeth 39 of the rack $11_a$. A worm wheel 40 is also secured to the shaft 37 and said worm wheel meshes with a worm 41 secured to a shaft 42 which is rotatably mounted in bearings 43. A hand wheel 44 is secured to the shaft 42, and by rotating said hand wheel, the vertical position of the roller 13 relative to the tiller may be varied so that when tilling the knives 17 will cut into the ground thus cutting up the vegetation and mixing it thoroughly with the soil, or when it is desired to transport the machine from place to place, the tiller will be higher than the roller 13 so that said tiller does not engage the ground.

In order to cut off the vegetation shortly after it is rolled flat by the roller 13, I provide a knife 45 which is adapted to drag along the ground directly behind said roller, said knife being supported by side arms 46 which are pivotally mounted on a rod 47 and is mounted transversely of the frame work 10. With this arrangement, the knife 45 may move vertically relative to the roller 13 so as to allow for slight irregularities in the surface of the ground.

In the modification shown in Figure 4, I provide a transverse heavy bar 48 which drags along the ground directly in front of the knife 45, said bar 48 being supported by side arms 49 pivotally mounted on a transverse bar 50 secured to the frame work 10$_a$. The bar 48 is adapted to hold the vegetation down so that a more perfect action of the knife 45 is obtained.

In the modification shown in Figure 5, a transverse heavy bar 48$_b$ is provided on its rearward end with a downwardly extending knife 51 which is positioned adjacent a tiller 52 similar to the tillers before described, so that after the vegetation is flattened out on the ground by the bar 48$_b$, the knives of the tiller 52 will cut the vegetation into small particles as they co-operate with the knife 51.

In the modification shown in Figure 6, the knife 53 is rigidly secured to the frame 54 of the apparatus, and the knives of the tiller 52$_c$ co-operate with the knife 53 to cut the vegetation into small particles.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a machine for tilling soil, a frame, a roller rotatably associated with said frame, means for changing the vertical position of said roller relative to said frame, said roller being adapted to support said frame as said frame is moved along the ground and being also adapted to flatten out vegetable matter growing on the ground, and a tilling element rotatably associated with said frame adapted to till the soil and to cut said vegetable matter into pieces after it is flattened out by said roller.

2. A device as described in claim 1 characterized by a knife pivotally connected to said frame, said knife being positioned between said roller and said tilling element, and being adapted to drag along the ground so as to cut off said vegetable matter close to the ground.

3. A device as described in claim 1 characterized by a knife positioned between said roller and said tilling element, said knife being adapted to drag along the ground so as to cut off vegetable matter close to the ground.

4. In a machine for tilling the soil, a frame, a vertically movable member slidably connected to said frame, a roller rotatably mounted on said member and adapted to support the frame and flatten out vegetable growth, means for moving said member vertically so as to vary the position of said roller relative to said frame, said frame being adapted to be moved along the ground by tractive means while said frame is supported by said roller, and a tilling element rotatably mounted on said frame adapted to till the soil and to cut vegetable matter into pieces.

5. A device as described in claim 4 characterized by a knife positioned between said roller and said tilling element, said knife being adapted to drag along the ground and to cut off vegetation.

6. In a machine for tilling soil, a frame, a roller adapted to support said frame on the ground as said frame is moved along the ground by tractive means, said roller being also adapted to flatten vegetation, a roller-like tilling element rotatably mounted in the said frame, and means for rotating said tilling element in a direction opposite to the rotation of said roller as said frame is moved along the ground.

7. A device as described in claim 6 characterized by a knife positioned between said roller and said tilling element, said knife being adapted to drag along the ground and cut off vegetation.

8. A device as described in claim 5 characterized by means for moving said roller vertically with respect to said frame.

9. In a machine for tilling soil, a frame, a vertically adjustable roller, said rollers serving to support the frame and to flatten vegetable growth, a tilling element rotatably associated with said frame and provided with parallel knives around its periphery, a knife between the roller and tilling element, and means for rotating said tilling element in a direction opposite to the rotation of said roller as said frame is moved along the ground by tractive means, said knives being adapted to till the soil and to cut vegetation into pieces after it has been flattened by said roller.

10. In a machine for tilling soil, a frame, a roller rotatably associated with said frame and adapted to support said frame as said frame is moved along the ground by tractive means, a tilling element rotatably associated with said frame, a knife positioned between said tilling element and said roller adapted to cut off vegetation, and a bar positioned transversely of said frame and between said knife and said roller adapted to drag on the ground so as to maintain the vegetation flattened by said roller in correct space relation with said knife.

CARSON CAUGHEY COOK.